July 7, 1964 L. R. ADAMS ETAL 3,140,472

DATA TRANSFER APPARATUS

Filed Dec. 30, 1959 3 Sheets-Sheet 1

INVENTORS
LESTER R. ADAMS
EDWARD H. SOMMERFIELD

BY John P. Dainty
ATTORNEY

July 7, 1964 L. R. ADAMS ETAL 3,140,472

DATA TRANSFER APPARATUS

Filed Dec. 30, 1959 3 Sheets-Sheet 2

July 7, 1964 L. R. ADAMS ETAL 3,140,472

DATA TRANSFER APPARATUS

Filed Dec. 30, 1959 3 Sheets-Sheet 3

United States Patent Office 3,140,472

Patented July 7, 1964

3,140,472

DATA TRANSFER APPARATUS

Lester R. Adams, Endwell, and Edward H. Sommerfield, Endicott, N.Y., assignors to International Business Machines Corporation, New York, N.Y., a corporation of New York Filed Dec. 30, 1959, Ser. No. 862,919
5 Claims. (Cl. 340—174)

Figure 1A:
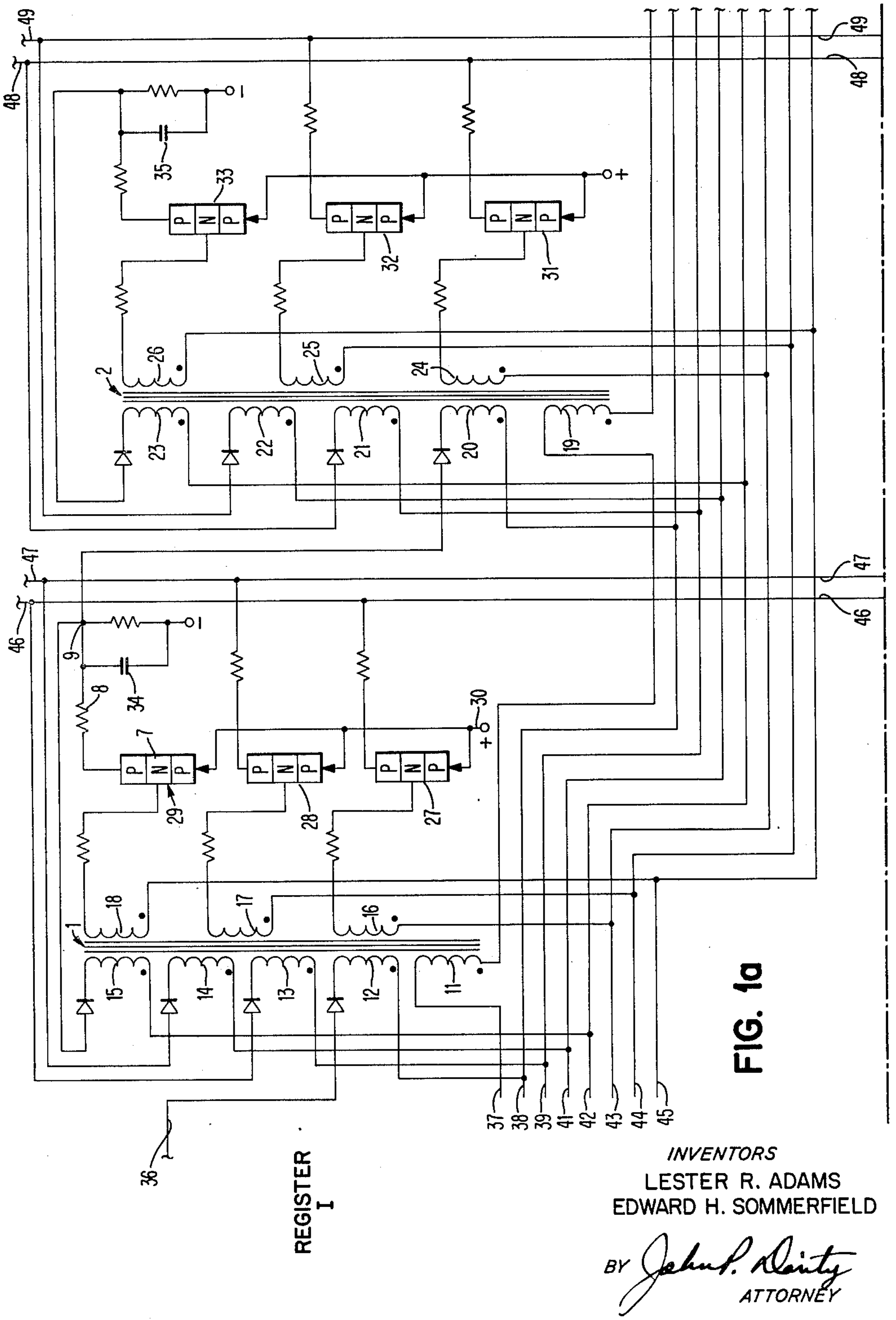

This invention relates to storage registers for data processing machines and more particularly to data transfer apparatus for such registers.

Magnetic core shift registers have many well known desirable characteristics. However, such registers are at times awkward to accommodate in data processing machines, particularly where a number of such registers are employed and where data transfers must be selectively effected between various ones of these registers and various other parts of the data processing machine. As in vacuum tube shift registers, capacitors have been used to temporarily store the output of one stage of the register for subsequent entry into the succeeding stage of the register. Such a temporary capacitor storage arrangement has been generally confined to serving as the transfer element between a pair of stages of a single register.

An object of the present invention is to provide a temporary or secondary storage element at the output of a stage of a magnetic core shift register capable of being selectively coupled to any one of a plurality of other shift register stages or other information receiving devices.

Another object of this invention is to provide a plurality of magnetic core shift registers with a common capacitor storage output device.

Another object of this invention is to provide an improved data transfer means for accommodating a plurality of registers.

A further object of this invention is to provide improved means for effecting transfers of data among several magnetic core shift registers.

Still another object of this invention is to provide improved means for selectively connecting a plurality of magnetic core shift registers to a common transmitting channel.

According to a preferred embodiment of the present invention, a plurality of magnetic core shift registers are provided with a common transmission channel and may selectively receive information from the channel or feed information to the channel. The transmission channel has connected thereto a secondary storage element in the form of a capacitor for temporarily storing an output received from any one of the shift register stages connected thereto. A bit stored in a selected stage of a particular register is fed to the common capacitor storage device by reversing the magnetic state of the core of that particular stage and switching the amplifier signal developed as a result of the core's changing states into the common storage capacitor of the transmisison channel. The common capacitor stores the signal or bit temporarily until some other shift register or signal receiving device is selected to receive the signal. The several receiving devices are each equipped with switching means whereby any of the devices may be switched in to receive the charge from the common capacitor. The several shift registers are also equipped with switching means whereby any one of the shift registers may be selectively switched in to charge the common capacitor. Thus a plurality of shift registers share a common transmission channel having a common temporary storage device. By providing means for transferring information among several magnetic core shift registers, a data processing machine may be given added flexibility since the information in one register may be shifted and/or dumped out in parallel to another register. By providing a transmission channel common to the several registers and by utilizing a single temporary storage device on the channel as a transfer element, a reduction in structure is achieved, and a large amount of flexibility is obtained.

A more specific object of the present invention is to provide a single core per bit magnetic core shift register with means for selectively shifting data to any one of a plurality of other single core per magnetic core shift register stages.

Another object of this invention is to provide means for shifting data from a plurality of single core per bit magnetic core shift register stages to a common secondary storage device from which the data may be selectively applied to any of a plurality of other registers.

A still further object of this invention is to provide improved data transfer apparatus including a plurality of channels for transferring data between a plurality of registers wherein data may be simultaneously transferred on all the channels without signal disturbance between the several channels.

Another object is to provide improved data transfer apparatus wherein a single channel between a plurality of registers serves as both an input and an output channel.

The foregoing and other objects, features and advantages of the invention will be apparent from the following more particular description of a preferred embodiment of the invention, as illustrated in the accompanying drawings.

Figure 1B:
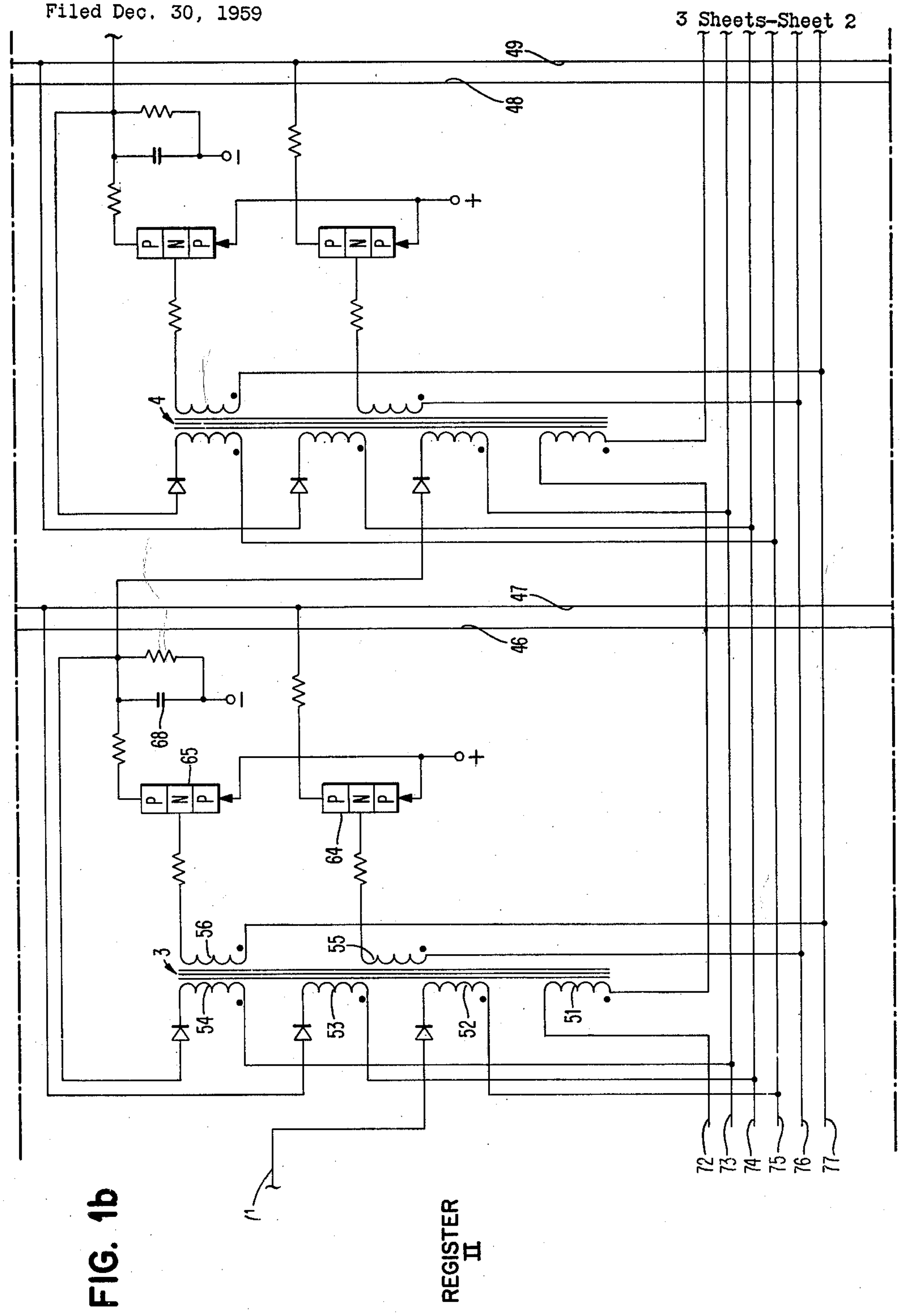
Figure 1C:
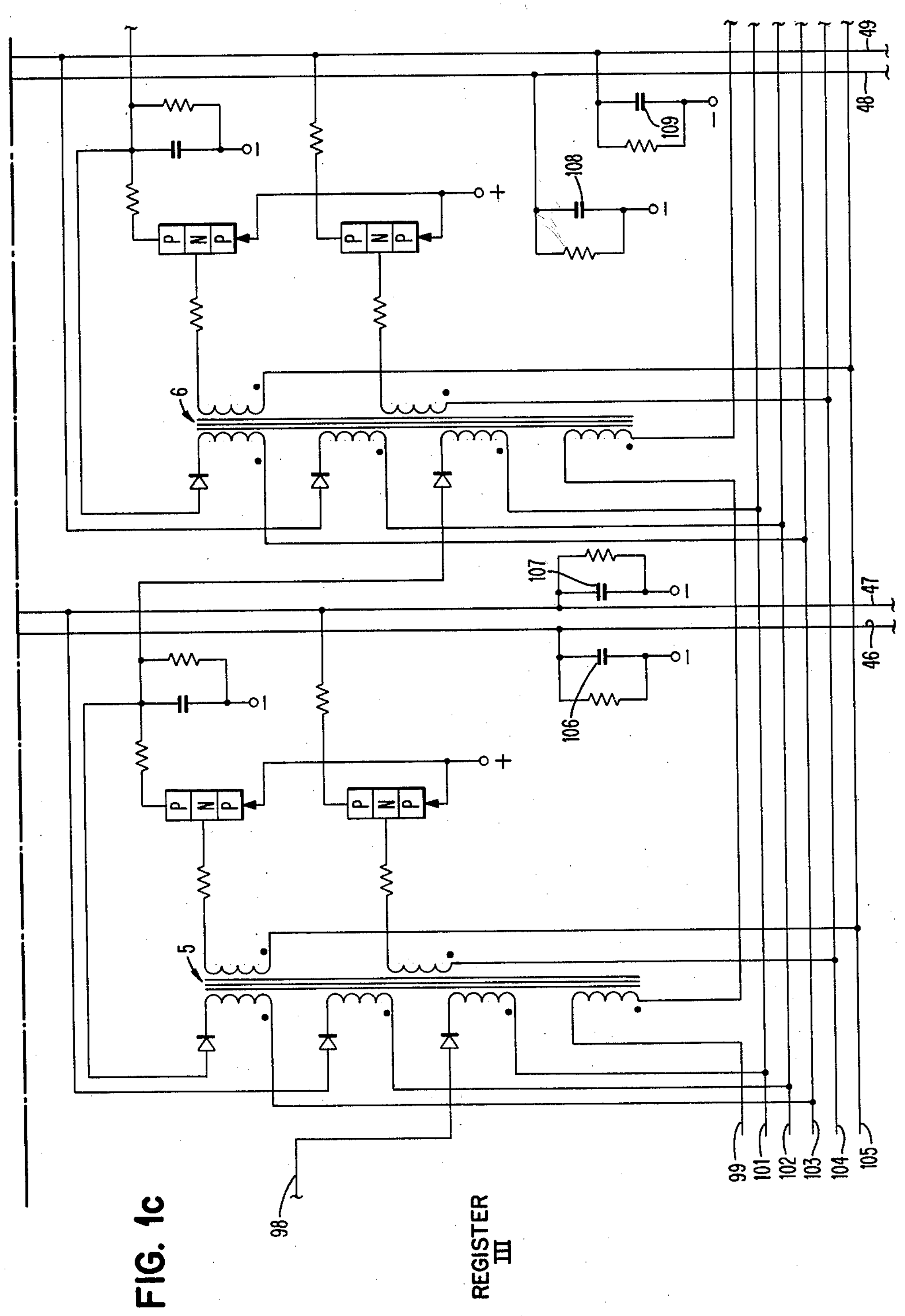

In the drawings:

FIGS. 1*a* through 1*c* are a schematic diagram of portions of three single core per bit magnetic core shift registers interconnected in accordance with the present invention.

Referring to FIGS. 1*a* through 1*c*, there are shown portions of three single core per stage magnetic core shift registers indicated as register I, register II and register III. Two stages of register I are shown and include primary storage elements in the form of cores 1 and 2, two stages of register II are shown and include cores 3 and 4, and the two stages of register III shown include cores 5 and 6. With particular reference to FIG. 1*a*, let it be assumed that the first stage of register I including core 1 is in a "reset" condition. The reset condition is arbitrarily taken as the condition in which the core is left after a negative-going pulse is applied to line 37. Information or data may be fed into register I over the input line 36 in the form of positive pulses while a negative potential is simultaneously applied to line 38. Current will flow from line 36 through winding 12 to line 38 and switch core 1 from its reset state to a "set" state. Cores 1, 2, 3, 4, 5 and 6 are made of material having substantial magnetic retentivity and all require similar driving currents to upset their states. With core 1 set in the above manner, the core may be said to be storing a "bit" of information. In order to read this bit of information out of core 1 to core 2 or to regenerate the bit in core 1, the shift or reset line 37 is energized simultaneously with a readout line 45. Negative potential is applied to line 37 and a negative potential is applied to line 45. The negative potential applied to line 45 is applied through winding 18 to the base 7 of a grounded emitter transistor amplifier configuration 29 and alone is insufficient to turn transistor 29 "on." However, if the core 1 was in a set condition and is reset by the potential applied to line 37 and the resulting current through winding 11, a potential will be developed across winding 18 of such a magnitude that, with the potential applied to line 45, the base of transistor 29 is lowered sufficiently to allow transistor 29 to conduct and charge condenser 34 from a terminal 30, through transistor 29 and a current limiting resistor 8 connected to a channel 9. The bit of information originally stored in core 1 is thus read out and switched by transistor 29 over channel 9 to capacitor 34 and temporarily stored in capacitor 34. Assume that it is now desired to transfer the bit from capacitor 34 to the second stage of register I. Serial read-in control line 38 is energized by applying a negative potential thereto to discharge capacitor 34 through winding 20 and set core 2 to store the "bit" by reversing the state of core 2. It is thus seen that the bit of information originally stored in core 1 may be transferred to core 2 of register I. In a like manner, the bit of information or a number of bits of information stored in register I may be shifted along as desired by operating the appropriate lines referred to above.

If it is desired to regenerate the bit temporarily stored in capacitor 34 back in core 1 rather than transferring it to core 2, a negative potential is applied to line 42. The negative potential on line 42 discharges capacitor 34 through winding 15 on core 1 and sets core 1 to again store the bit originally stored therein. Thus, by selectively applying a negative potential to lines 38 or 42, the bit temporarily stored in capacitor 34 may be selectively transferred over channel 9 to either core 1 or core 2.

Assuming now that it is desired to transfer the bit of information stored in core 1 to core 3 of register II. A negative pulse is applied to line 37 to reset core 1 and simultaneously a negative-going pulse is applied to line 44. The voltage developed across winding 17 as a result of core 1 changing states in conjunction with the negative voltage applied to line 44 is sufficient to cause transistor 28 to conduct. As transistor 28 conducts, the capacitor 107, FIG. 1*c*, connected to the channel 47, is charged in a similar manner as described above with respect to condenser 34. Thus, the bit of information originally stored in core 1 is transferred over channel 47 and is temporarily stored in capacitor 107. Since it is desired to place the bit of information in core 3, the line 74, FIG. 1*b*, has a negative-going pulse applied thereto such that the charge stored in capacitor 107 is discharged through winding 53 on core 3. In this manner, the bit of information originally stored in core 1 is transferred to core 3. If, instead of transferring the bit of information from core 1 to core 3, it is desired to transfer the bit to core 5 of register III, the line 102 of register III rather than line 74 of register II is supplied with a negative potential to discharge capacitor 107 through winding 81 and thus set core 5.

The bit of information may also be regenerated in core 1 at the same time that it is transferred to either core 3 or core 5. To accomplish this, line 45 is supplied with a negative pulse at the same time that the negative pulse is applied to line 44. In this manner both capacitors 34 and 107 are simultaneously charged as a result of resetting core 1. Subsequently lines 42 and 74 or 102 are simultaneously supplied with negative-going pulses to discharge capacitors 34 and 107 through windings 15 and 53 or 81, respectively. In this manner, the data stored in core 1 may be regenerated therein while being simultaneously transferred to one of a plurality of other cores. The bit of information stored in core 1 may also be placed on a third channel 46 at the same time that it is placed on channels 9 and 47. This may be accomplished by applying a negative potential to line 43 simultaneously with the application of the negative potential to line 37. As the core 1 is reversed in its state of magnetization the potential on line 43 in conjunction with the voltage induced in winding 16 will turn transistor amplifier 27 on to charge capacitor 106, FIG. 1*c*, over channel 46. As shown, the bit of information temporarily stored in capacitor 106 may be regenerated in core 1 or by lines not shown may be transferred to any other core as desired. To regenerate the bit in core 1 from the capacitor 106, it is only necessary to apply a negative potential to line 39 to discharge the capacitor 106 through winding 13 on core 1 to set core 1 in the initial state. It is to be understood that capacitor 106 might receive its charge from any desired core other than core 1.

In a manner similar to the manner described above, a bit stored in either core 3 or 5 may be placed on channel 47 to charge capacitor 107 and may be transferred to any other register as desired. A bit temporarily stored in capacitor 107 may be transferred to core 1 by applying a negative potential to line 41 causing the capacitor to be discharged through winding 14.

Data from cores 2, 4 or 6 may be placed on channel 49 in the same manner as data from cores 1, 3 or 5 is placed on channel 47. A bit of data placed on channel 49 will charge capacitor 109 to temporarily store the bit therein. The transfer of data between cores 2, 4 and 6 is accomplished in the same manner as the transfer of data between cores 1, 3 and 5. The windings 19, 20, 21, 22 and 23 on core 2 correspond to and function in the same manner as the windings 11, 12, 13, 14 and 15 on core 1 as described above. Also the windings 24, 25, 26 on core 2 correspond to the windings 16, 17 and 18 on core 1 and these windings 24, 25 and 26 operate respectively with lines 43, 44 and 45 to energize corresponding transistor amplifiers 31, 32 and 33 to respectively charge capacitors 108, 109 and 35. Although only two stages of the registers I, II and III are shown it is intended that the registers be of any desired length.

Any of the registers I, II or III shown may operate with the other registers shown in the same manner that register I has been described operating with registers II and III. The lines 71, 72, 73, 74, 75, 76 and 77 respectively correspond to lines 36, 37, 38, 39, 41, 42, 44 and 45 of register I and may be employed to obtain the same functions as described above for register I. Windings 55 and 56 on core 3 correspond in function to windings 17 and 18 on core 1. The transistor amplifiers 64 and 65 correspond in their switching function to transistor amplifiers 28 and 29 associated with core 1. The several windings and transistor amplifiers associated with cores 4, 5 and 6 corresponding to the windings and amplifiers similarly located in association with core 3.

From the above it is apparent that by employing a single capacitor on a single channel, data may be transferred among a plurality of magnetic cores. It is also apparent that by employing a plurality of channels, each equipped with a single capacitor as a secondary storage element, data may be simultaneously transferred from any one of a plurality of cores to any number of other cores and simultaneously regenerated back in the core from which the data originated if desired. These transfers are accomplished without signal interference between channels.

While the invention has been particularly shown and described with reference to a preferred embodiment thereof, it will be understood by those skilled in the art that various changes in form and details may be made therein without departing from the spirit and scope of the invention.

What is claimed is:

1. Data transfer apparatus comprising in combination, a plurality of channels, a capacitor connected to each of said channels, a plurality of storage elements, means for selectively energizing said storage elements to read out information therefrom, switching means for connecting the storage element selectively energized to read out information to selectively charge said capacitors, and selective means for discharging said capacitors to selectively read into said storage elements.

2. Data transfer apparatus comprising in combination, a plurality of channels, a capacitor connected to each of said channels, a plurality of storage elements each comprising a magnetic core having substantial retentivity with winding means disposed thereon, means for selectively energizing said winding means to read data out of said magnetic cores, switching means arranged to be selectively activated for connecting the selectively energized winding means to said channels to selectively charge said capacitors, and selective means for discharging said capacitors through selected ones of said winding means.

3. Apparatus according to claim 2 wherein said switching means comprises a plurality of amplifiers having outputs connected to said channels, selective means selectively coupling a capacitor to the winding means on the core which initially charged said capacitor through said amplifiers for regenerating said core whereby data may be read out, regenerated, and transferred at the same time.

4. Apparatus according to claim 3 wherein said amplifiers each comprise a grounded emitter transistor configuration.

5. Apparatus according to claim 4 wherein said grounded emitter transistor configuration is controlled at a base electrode through said winding means.

References Cited in the file of this patent

UNITED STATES PATENTS

| | | |
|---|---|---|
| 2,805,409 | Mader | Sept. 3, 1957 |
| 2,834,007 | Smith | May 6, 1958 |
| 2,863,138 | Hemphill | Dec. 2, 1958 |
| 2,886,799 | Crooks | May 12, 1959 |
| 2,911,621 | Crooks | Nov. 3, 1959 |
| 2,946,987 | Townsend | July 26, 1960 |
| 2,983,905 | Buser et al. | May 9, 1961 |
| 3,024,446 | Kornfield | Mar. 6, 1962 |